United States Patent
Sung et al.

(10) Patent No.: US 12,482,809 B2
(45) Date of Patent: Nov. 25, 2025

(54) NEGATIVE ELECTRODE FOR SECONDARY BATTERY, AND SECONDARY BATTERY INCLUDING SAME

(71) Applicant: LG ENERGY SOLUTION, LTD., Seoul (KR)

(72) Inventors: Ki Won Sung, Daejeon (KR); Eun Ju Lee, Daejeon (KR); Ju Ri Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 803 days.

(21) Appl. No.: 17/616,356

(22) PCT Filed: Jan. 25, 2021

(86) PCT No.: PCT/KR2021/000961
§ 371 (c)(1),
(2) Date: Dec. 3, 2021

(87) PCT Pub. No.: WO2021/201399
PCT Pub. Date: Oct. 7, 2021

(65) Prior Publication Data
US 2022/0255059 A1 Aug. 11, 2022

(30) Foreign Application Priority Data

Apr. 3, 2020 (KR) .................. 10-2020-0040631

(51) Int. Cl.
*H01M 4/36* (2006.01)
*H01M 4/02* (2006.01)
(Continued)

(52) U.S. Cl.
CPC ........... *H01M 4/364* (2013.01); *H01M 4/133* (2013.01); *H01M 4/134* (2013.01); *H01M 4/366* (2013.01);
(Continued)

(58) Field of Classification Search
CPC ...... H01M 4/364; H01M 4/133; H01M 4/134; H01M 4/366; H01M 4/505; H01M 4/525;
(Continued)

(56) References Cited

U.S. PATENT DOCUMENTS 10,454,096 B2   10/2019   Kim et al.
2017/0077497 A1*  3/2017  Ogata ................... H01M 4/587
(Continued)

FOREIGN PATENT DOCUMENTS

CN    107248592 A    10/2017
CN    107785535 A     3/2018
(Continued)

OTHER PUBLICATIONS

Extended European Search Report dated Dec. 21, 2022 issued in the European Patent Application No. 21779427.0.
(Continued)

*Primary Examiner* — Allison Bourke
*Assistant Examiner* — Robert Gene West
(74) *Attorney, Agent, or Firm* — Morgan, Lewis & Bockius LLP

(57) ABSTRACT

The technology relates to a negative electrode for a secondary battery, and a secondary battery including same. The negative electrode comprises a composite material layer having a double-layer structure, but includes silicon oxide and carbon nanotubes in only one layer, such that it is possible to increase the capacity of a battery while preventing structural deterioration of the negative electrode due to changes in electrode volume during charging and discharging.

15 Claims, 6 Drawing Sheets

(51) Int. Cl.
*H01M 4/133* (2010.01)
*H01M 4/134* (2010.01)
*H01M 4/505* (2010.01)
*H01M 4/525* (2010.01)
*H01M 4/587* (2010.01)
*H01M 10/0525* (2010.01)

(52) U.S. Cl.
CPC .......... *H01M 4/505* (2013.01); *H01M 4/525* (2013.01); *H01M 4/587* (2013.01); *H01M 10/0525* (2013.01); *H01M 2004/021* (2013.01); *H01M 2004/027* (2013.01); *H01M 2004/028* (2013.01)

(58) Field of Classification Search
CPC ............. H01M 4/587; H01M 10/0525; H01M 2004/021; H01M 2004/027; H01M 2004/028
USPC ......................................................... 429/231
See application file for complete search history.

(56) References Cited

U.S. PATENT DOCUMENTS

| | | | |
|---|---|---|---|
| 2018/0151873 A1* | 5/2018 | Matsuno | H01M 4/483 |
| 2020/0091506 A1* | 3/2020 | Jo | H01M 4/364 |
| 2022/0052320 A1 | 2/2022 | Chen et al. | |

FOREIGN PATENT DOCUMENTS

| | | | | |
|---|---|---|---|---|
| CN | 109980199 | A | | 7/2019 |
| EP | 3591749 | A1 | | 1/2020 |
| JP | 2015-179575 | A | | 10/2015 |
| JP | 2018-125077 | A | | 8/2018 |
| JP | 2018181539 | A | * | 11/2018 |
| JP | 2019-075199 | A | | 5/2019 |
| JP | 6600944 | B2 | | 11/2019 |
| KR | 10-2014-0137660 | A | | 12/2014 |
| KR | 10-2014-0138079 | A | | 12/2014 |
| KR | 10-2016-0087121 | A | | 7/2016 |
| KR | 10-2017-0075963 | A | | 7/2017 |
| KR | 10-2019-0001566 | A | | 1/2019 |
| KR | 10-2019-0064480 | A | | 6/2019 |
| KR | 10-2019-0065172 | A | | 6/2019 |
| KR | 20190064480 | A | * | 6/2019 |
| KR | 10-1986626 | B1 | | 9/2019 |
| KR | 10-2020-0031391 | A | | 3/2020 |
| WO | 2019/108039 | A2 | | 6/2019 |
| WO | 2020/021763 | A1 | | 1/2020 |

OTHER PUBLICATIONS

International Search Report (with partial translation) and Written Opinion dated Apr. 30, 2021 issued in corresponding International Patent Application No. PCT/KR2021/000961.

Office action dated Aug. 26, 2023 issued in corresponding Chinese Patent Application No. 202180003783.7.

* cited by examiner

[FIG. 1]
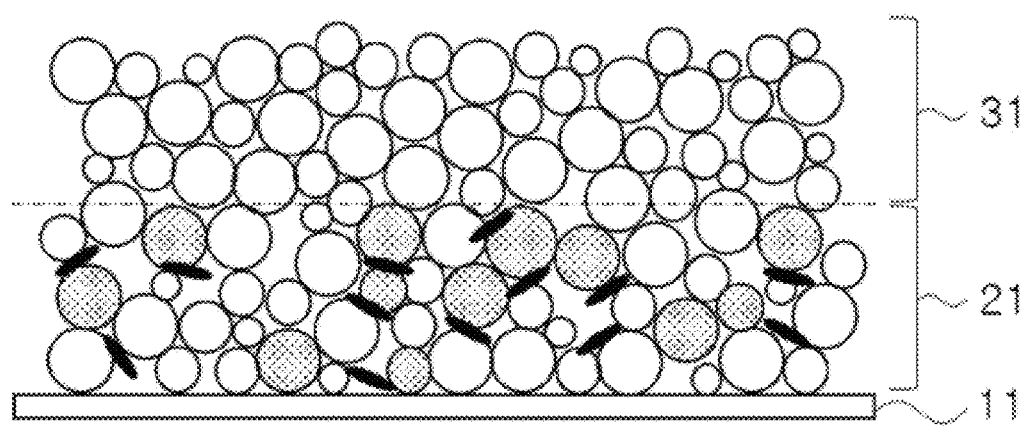

[FIG. 2]
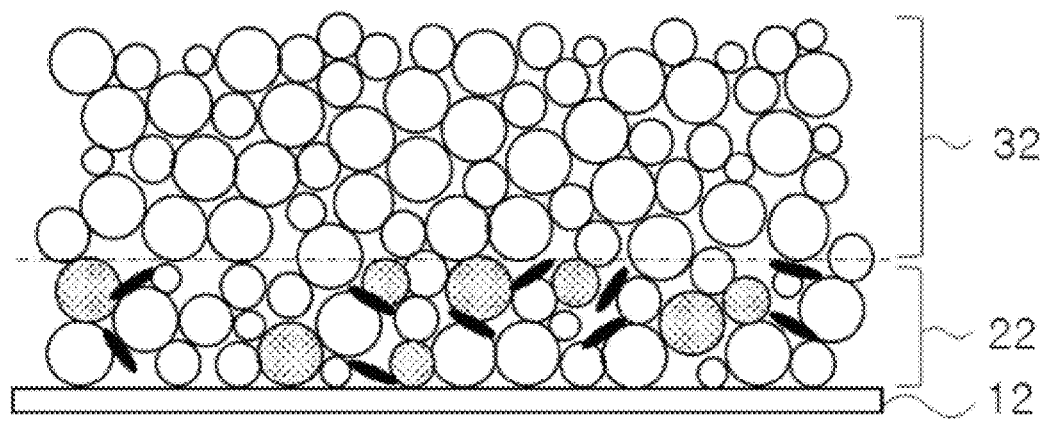

[FIG. 3]
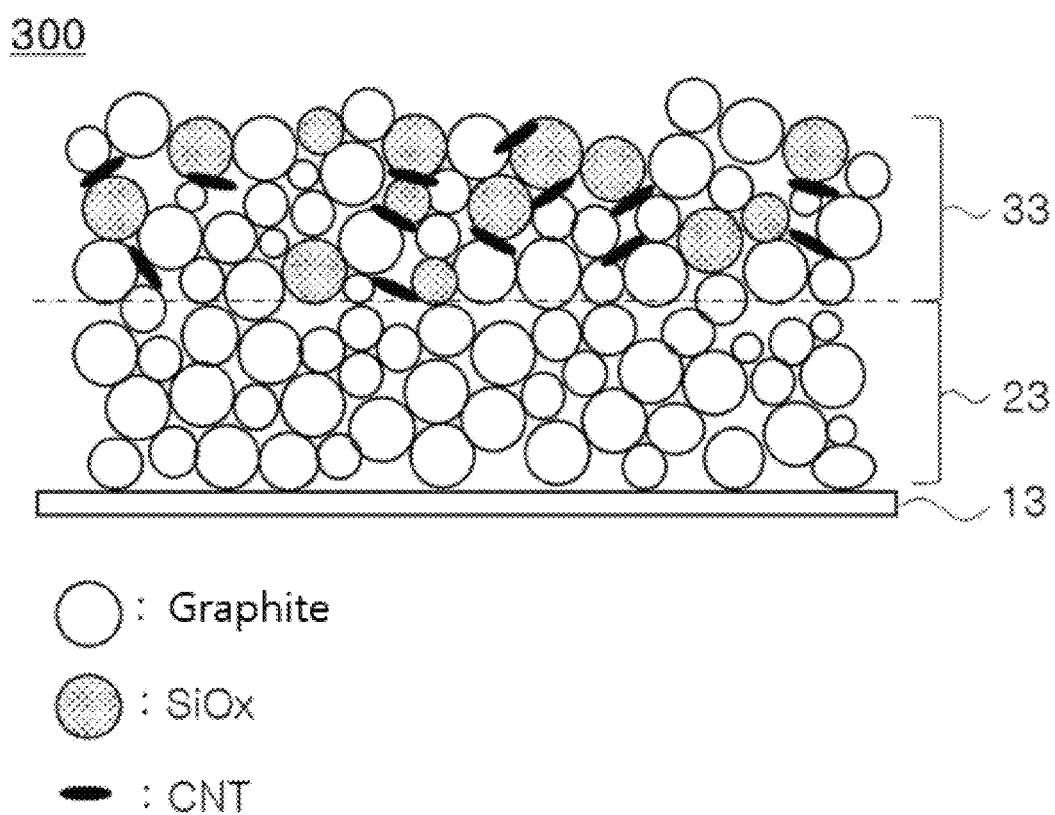

[FIG. 4]
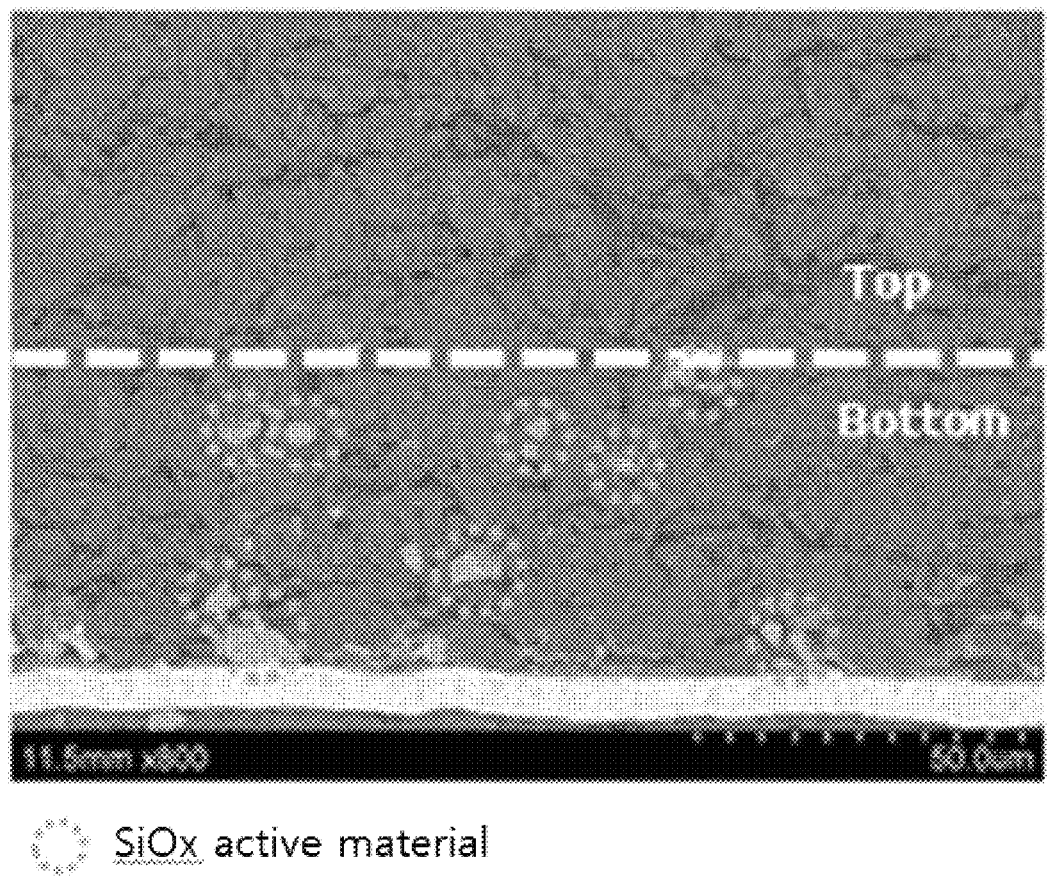

[FIG. 5]
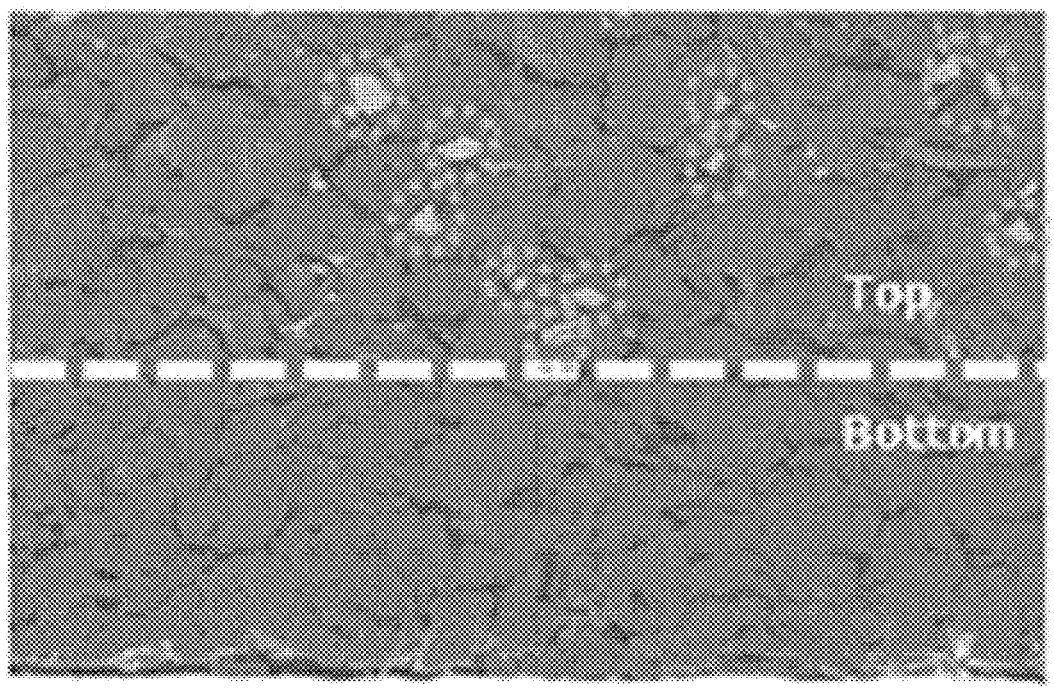
SiOx active material

[FIG. 6]
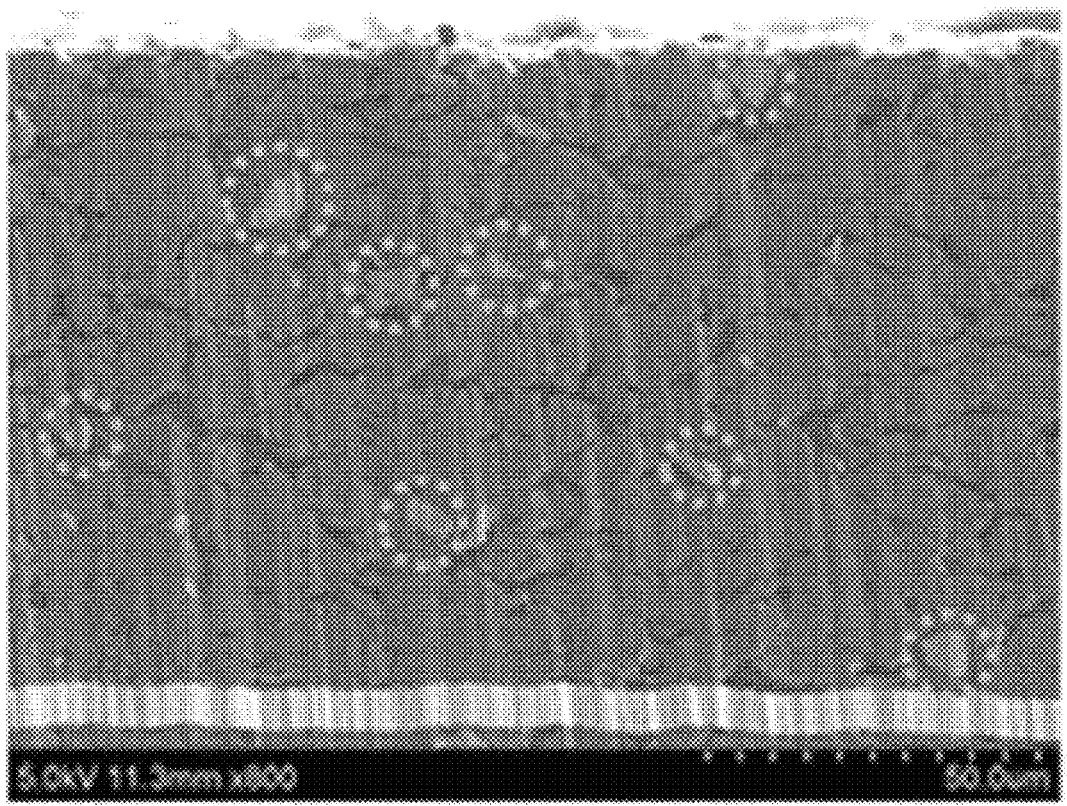
SiOx active material

NEGATIVE ELECTRODE FOR SECONDARY BATTERY, AND SECONDARY BATTERY INCLUDING SAME

TECHNICAL FIELD

This application claims the benefit of priority based on Korean Patent Application No. 10-2020-0040631, filed on Apr. 3, 2020, and the entire contents of the Korean patent application are incorporated herein by reference.

The present invention relates to a negative electrode for a secondary battery, and a secondary battery including the same.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

Further, as the interest in environmental issues increases, there is an increasing need in devices using high capacity batteries, such as electric vehicles and hybrid electric vehicles which can substitute vehicles using fossil fuels such as gasoline vehicles and diesel vehicles. As such, there is a need for a high capacity design of electrodes for manufacturing lithium secondary batteries having a high energy density, a high output, and a high discharge voltage.

This secondary battery is being developed as a model capable of realizing high voltage and high capacity at the request of consumers. In order to realize high capacity, an optimization process of a positive electrode, a negative electrode, a separator, and an electrolyte solution, which are the four major elements of a secondary battery, is required within a limited space.

On the other hand, the capacity, output and lifetime of the basic performance characteristics of the secondary battery are greatly affected by the negative electrode material. In order to maximize the performance of a battery, the negative electrode active material should have an electrochemical reaction potential close to a lithium metal, a high reaction reversibility with lithium ions, and a high diffusion rate of lithium ions in the active material.

The limit theoretical capacity of the carbon-based material, which has been mainly used as a material constituting the negative electrode of the secondary battery, is 372 mAh/g, which has made it difficult to increase the energy density. As an alternative to solve this problem, the silicon material is being reviewed. The silicon-based material has a theoretical capacity of 10 times more than that of a general carbon-based material. Herein, the charge/discharge efficiency of the carbon-based material is about 92%, but the charge/discharge efficiency of the silicon-based material is only about 80% and the volume change rate at the time of charge/discharge of the silicon-based material is 300% or more, which leads to a problem that the silicon-based material fails to operate as the active material if the conductive path is disconnected in a continuous charge/discharge process.

Therefore, there is a need for a process for manufacturing a negative electrode for improving charge/discharge efficiency while having a high capacity, and its design improvement.

DISCLOSURE

Technical Problem

The present invention has been made to solve the above problems and provides a negative electrode for a secondary battery capable of improving charge/discharge efficiency while having a high capacity, and a secondary battery including the same.

Technical Solution

A negative electrode for a secondary battery according to the present invention comprises: a current collector; and a mixture layer formed on one or both surfaces of the current collector, wherein the mixture layer has a two-layer structure in which a first mixture layer and a second mixture layer are stacked, wherein the first mixture layer includes a first carbon material and a silicon oxide as a first active materials in a weight ratio of 90 to 99:1 to 10 and a first needle type carbon-based conductive material as a first conductive material, and wherein the second mixture layer includes a second carbon material as a second active material and a second sphere type carbon-based conductive material as a second conductive material.

In one example, the first mixture layer is disposed directly on the current collector, and wherein the second mixture layer is disposed on a surface of the first mixture layer on which the current collector is not disposed.

In another example, the second mixture layer is disposed directly on the current collector, and wherein the first mixture layer is disposed on a surface of the second mixture layer on which the current collector is not disposed.

In one example, the first conductive material includes the needle type carbon-based conductive material and a first sphere type carbon-based conductive material in a weight ratio of 0.01 to 1:0.5 to 5.

In one example, the first mixture layer and the second mixture layer include first and second binders, respectively, and wherein a weight ratio (B1:B2) of the first binder content (B1) to the second binder content (B2) is in a range of 1.0 to 3.6:1. Further, the first binder includes 1 to 10 parts by weight based on a total weight of the first mixture layer.

More specifically, the first mixture layer includes: 90 to 100 parts by weight of the first carbon material and 1 to 10 parts by weight of silicon oxide as the first active materials; 0.01 to 1 parts by weight of the first needle type carbon-based conductive material and 0.5 to 5 parts by weight of a first sphere type carbon-based conductive material as conductive materials; and 1 to 10 parts by weight of a first binder. Further, the second mixture layer includes: 90 to 100 parts by weight of the second carbon material as the second active material; 0.5 to 5 parts by weight of the second sphere type carbon-based conductive material as the second conductive material; and 1 to 10 parts by weight of a second binder.

In one example, the second sphere type carbon-based conductive material is carbon black, and wherein the first needle type carbon-based conductive material is a carbon nanotube (CNT), a vapor-grown carbon fiber (VGCF), a carbon nanofiber (CNF), or a mixture of two or more thereof.

In another example, a ratio (D1:D2) of an average thickness (D1) of the first mixture layer to an average thickness of the second mixture layer (D2) is in a range of a thickness ratio of 0.1 to 0.9:1.

In addition, the present invention provides a secondary battery including the negative electrode for a secondary battery described above. More specifically, the secondary battery comprises: a negative electrode for a secondary battery described above; a positive electrode containing lithium-containing oxide as an active material; and a separator interposed between the negative electrode and the positive electrode.

In one example, the lithium-containing oxide has a structure represented by one of following chemical formulas:

$$Li_x(Ni_aCo_bMn_c)O_2 \quad \text{[Chemical formula 1]}$$

where $0.5<x<1.3$, $0.5<a<1$, $0<b<0.25$, $0<c<0.25$, $a+b+c=1$, and $$Li_x(Ni_aCo_bMn_cAl_d)O_2 \quad \text{[Chemical formula 2]}$$

where $0.5<x<1.3$, $0.6<a<1$, $0<b<0.2$, $0<c<0.1$, $0<d<0.1$, $a+b+c+d=1$.

Advantageous Effects

A negative electrode for a secondary battery and a secondary battery including the same according to the present invention include a mixture layer of a double layer structure. In this case, since silicon oxide and needle type carbon-based conductive material are included in only one layer, it is possible to increase the battery capacity while preventing structural deterioration of the negative electrode according to the volume change during the charge/discharge.

BRIEF DESCRIPTION OF THE DRAWINGS

FIGS. 1 to 3 are views each schematically showing a cross section of a negative electrode for a lithium secondary battery according to an embodiment of the present invention.

FIG. 4 is a cross-sectional SEM photograph of a negative electrode according to Example 2 of the present invention.

FIG. 5 is a cross-sectional SEM photograph of a negative electrode according to Example 4 of the present invention.

FIG. 6 is a cross-sectional SEM photograph of a negative electrode according to Comparative Example 1.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The negative electrode for a secondary battery according to the present invention includes a current collector and a mixture layer formed on one or both surfaces of the current collector, and the mixture layer has a 2-layer structure in which the first mixture layer and the second mixture layer are stacked. The first mixture layer includes the carbon material and the silicon oxide in the weight ratio of 90 to 99:1 to 10 as the active material and includes the needle type carbon-based conductive material as the conductive material, and the second mixture layer includes the carbon material as the active material and includes the sphere type carbon-based conductive material as the conductive material.

Here, the "sphere type" means having a spherical particle shape or a shape similar thereto, and having an average diameter (D50) of 10 to 500 nm, specifically 15 to 100 nm or 15 to 40 nm.

The sphere-type carbon-based conductive material may improve physical contact between active materials to reduce interface resistance by filling the pores, which are empty spaces between active material particles in a mixed state with a binder, and may improve the adhesion between the negative electrode active material and the current collector. The sphere type carbon-based conductive material may include carbon black including Denka Black, for example, FX35 (Denka), SB50L (Denka), Super-P (Imerys), but is not limited thereto.

Further, the term "needle type" means that the shape of a particle like a needle, for example, an aspect ratio (a value of length/diameter) is in a range of 50 to 650, specifically 60 to 300 or 100 to 300. The needle type carbon-based conductive material may be a carbon nanotube (CNT), a vapor-grown carbon fiber (VGCF), a carbon nanofiber (CNF), or a mixture of two or more of them.

In the present invention, the first mixture layer includes a needle type carbon-based conductive material as a conductive material, and the second mixture layer uses a sphere type carbon-based conductive material as a conductive material. More specifically, the first mixture layer uses a mixture of the needle type carbon-based conductive material and the sphere type carbon-based conductive material as the conductive material, and the second mixture layer uses the sphere type carbon-based conductive material as the conductive material. There is a large volume change in a silicon-based active material such as a silicon oxide contained in the first mixture layer. As such, when a sphere type carbon-based material is used as a conductive material, cracks may be generated due to a volume expansion during the repeated charge/discharge processes. At this time, the sphere type carbon-based conductive material may be separated from the active material. Therefore, by including the needle type carbon-based conductive material and the sphere type carbon-based conductive material in the first mixture layer, it is possible to fill the inside of the pore between the carbon material and the silicon oxide and maintain the conductive path between active materials. As such, when the silicon oxide is expanded or contracted, the conductivity between silicon oxides can be maintained, and the binding force between the carbon material and silicon oxide particles can be improved, thereby improving cycle characteristics of the secondary battery.

In one example of the present invention, the first mixture layer is formed to contact the current collector, and the second mixture layer is formed on an opposite surface of a surface contacting the current collector on a basis of the first mixture layer. In this case, it is possible to implement the high capacity of the secondary battery by including silicon oxide in the first mixture layer contacting the current collector.

In another example, the second mixture layer is formed to contact the current collector, and the first mixture layer is formed on an opposite surface of a surface contacting the current collector on a basis of the second mixture layer. In this case, it is possible to include silicon oxide in the first mixture layer which is formed on the opposite surface of a surface contacting the current collector.

In one example of the present invention, the conductive material of the first mixture layer includes a needle type carbon-based conductive material and a sphere type carbon-based conductive material in a weight ratio of 0.01 to 1:0.5 to 5.

The needle type carbon-based conductive material may be a carbon nanotube (CNT), a vapor-grown carbon fiber (VGCF), a carbon nanofiber (CNF), or a mixture of two or more of them. Alternatively, the carbon nanotube may be one or more selected from the group consisting of a single walled carbon nanotube and a multi walled carbon nanotube, but it is not limited thereto.

The single walled carbon nanotube indicates that as hexagons made by combining 6 carbon atoms are connected to each other to form one tube-shaped carbon nanotube, and the number of walls (graphite surfaces) in the carbon nanotube is one. The single walled carbon nanotube shows excellent electric characteristics due to one directional structure and shows various electronic characteristics according to the chirality structure the diameter of a hexagonal honeycomb shape. A multi walled carbon nanotube indicates that there are a plurality of walls described above. In one example of the present invention, a single walled carbon nanotube may be used as the needle type carbon-based conductive material.

Further, the sphere type carbon-based conductive material may include carbon black including Denka Black, for example, FX35 (Denka), SB50L (Denka), Super-P (Imerys), but is not limited thereto.

In one example, the conductive material of the first mixture layer may contain the needle type carbon-based conductive material and the sphere type carbon-based conductive material in the weight ratio of 0.01 to 1:0.5 to 5, the weight ratio of 0.05 to 0.9:0.6 to 4, the weight ratio of 0.1 to 0.8:0.7 to 3, the weight ratio of 0.2 to 0.7:0.8 to 2, the weight ratio of 0.4 to 0.6:0.9 to 1, or the weight ratio of 0.5:1. As described above, the carbon nanotube and the carbon black can fill the inside of the pore between the carbon material and the silicon oxide and maintain the conductive path between respective active materials, and can improve the cycle characteristic of the secondary battery by maintaining the conductivity between silicon oxides at the time of expansion and shrinkage of the silicon oxides and improving the binding property between the carbon material and the silicon oxide.

In one example, the first mixture layer and the second mixture layer include a binder, and a ratio (B1:B2) of a binder content (B1) of the first mixture layer to a binder content (B2) of the second mixture layer is in a range of a weight ratio of 1.0 to 3.6:1. Specifically, the ratio (B1:B2) of the binder content (B1) of the first mixture layer to the binder content to the binder content (B2) of the second mixture layer may be in a range of the weight ratio of 1.2 to 3:1, the weight ratio of 1.2 to 2:1, or the weight ratio of 1.4 to 2:1.

In one example of the present invention, when the first mixture layer is formed to contact the current collector, and the second mixture layer is formed on the first mixture layer, the binder content of the first mixture layer is set to be higher than the binder content of the second mixture layer, thereby increasing the bonding force with the current collector. Further, the physical properties of the electrode are enhanced by setting the binder content of the second mixture layer to be relatively low. At this time, the binder content of the first mixture layer may be a range of 1 to 10 parts by weight, 2 to 5 parts by weight, or 3 to 4.5 parts by weight, based on the total weight of the first mixture layer. The binder content contained in the first mixture layer may be applied in a normal range.

As the binder, various kinds of binder polymers such as polyvinylidenefluoride-hexafluoropropylene copolymer (PVDF-co-HEP), polyvinylidenefluoride, polyacrylonitrile, polymethylmethacrylate, polyvinyl alcohol, carboxymethyl-cellulose (CMC), starch, hydroxypropylcellulose, regenerated cellulose, polyvinylpyrrolidone, polytetrafluoroethylene, polyethylene, polypropylene, polyacrylic acid, styrene boutyren rubber (SBR), fluorine rubber, various copolymers, etc. may be used.

In one example of the present invention, the first mixture layer includes: 90 to 100 parts by weight of a carbon material and 1 to 10 parts by weight of silicon oxide as active materials; 0.01 to 1 parts by weight of a needle type carbon-based conductive material and 0.5 to 5 parts by weight of sphere type carbon-based conductive material as conductive materials; and 1 to 10 parts by weight of a binder. Specifically, the first mixture layer includes: 92 to 98 parts by weight of a carbon material and 2 to 8 parts by weight of silicon oxide as active materials; 0.01 to 0.7 parts by weight of a needle type carbon-based conductive material and 0.6 to 3 parts by weight of sphere type carbon-based conductive material as conductive materials; and 2 to 8 parts by weight of a binder. More specifically, the first mixture layer includes: 94 to 97 parts by weight of a carbon material and 3 to 6 parts by weight of silicon oxide as active materials; 0.01 to 0.6 parts by weight of a needle type carbon-based conductive material and 0.7 to 2 parts by weight of sphere type carbon-based conductive material as conductive materials; and 2.5 to 6 parts by weight of a binder. More specifically, the first mixture layer includes: 95 to 96 parts by weight of a carbon material and 4 to 5 parts by weight of silicon oxide as active materials; 0.3 to 0.5 parts by weight of a needle type carbon-based conductive material and 0.7 to 1 parts by weight of sphere type carbon-based conductive material as conductive materials; and 2.5 to 5 parts by weight of a binder. At this time, the weight ratio of the carbon material to the silicon oxide may be in a range of 90 to 99:1 to 10, 95 to 99:1 to 5, or 95 to 97:3 to 5, or may be 95:5. When the above range is satisfied, the capacity increase effect of the secondary battery can be increased while minimizing the decrease in the physical properties according to the addition of silicon oxide. Further, as described above, the needle type carbon-based conductive material and the sphere type carbon-based conductive material may fill the inside of the pore between the active materials within the above range and may improve the binding property between silicon oxides at the time of expansion or shrinkage of the silicon oxides, thereby improving cycle characteristics of the secondary battery.

In one example of the present invention, the second mixture layer includes: 90 to 100 parts by weight of a carbon material as an active material; 0.5 to 5 parts by weight of a sphere type carbon-based conductive material as a conductive material; and 1 to 10 parts by weight of a binder. Specifically, the second mixture layer includes: 92 to 98 parts by weight of a carbon material as an active material; 0.7 to 3 parts by weight of a sphere type carbon-based conductive material as a conductive material; and 1 to 5 parts by weight of a binder. More specifically, the second mixture layer includes: 95 to 97 parts by weight of a carbon material as an active material; 1 to 2 parts by weight of a sphere type carbon-based conductive material as a conductive material; and 1 to 3 parts by weight of a binder.

On the other hand, the carbon material may be graphite. Specifically, graphite may be natural graphite or artificial graphite. When the first mixture layer is formed to be in contact with the current collector, graphite contained in the first mixture layer contains artificial graphite or contains artificial graphite and natural graphite, and graphite contained in the second mixture layer contains artificial graphite.

In one example, the first mixture layer contains natural graphite. In this case, in order to improve the adhesive force with the current collector, the natural graphite is preferably large in the tap density or bulk density. For example, in the natural graphite, the crystalline orientation preferably exhibits an anisotropic property, and thus amorphous graphite can be effectively applied. Further, the larger the tap density, the smaller the amount of the solvent required for the production of the slurry having the same viscosity. As such, the adhesive force degradation by the binder movement can be reduced during drying.

Further, the second mixture layer contains artificial graphite. The artificial graphite may be in the form of powder, flakes, blocks, plate, or rods. Specifically, in the artificial graphite, the smaller the moving distance of the lithium ions, the better the output characteristics, and in order to shorten the moving distance in the electrode direction, the crystalline orientation of the artificial graphite preferably exhibits an isotropic property. Thus, the artificial graphite may be flake-shaped or plate-shaped.

In addition, the silicon oxide may be particle-shaped, and the silicon oxide particle may be a composite composed of amorphous $SiO_2$ and crystalline Si. In this case, silicon oxide particles may be represented by $SiOx$ ($0<x<2$). For example, the silicon oxide may be SiO. In one example, the average particle diameter (D50) of the silicon oxide may be in the range of 0.05 μm to 30 μm, specifically 0.5 μm to 20 μm, and more specifically 1 μm to 15 μm.

In one example of the present invention, the ratio (D1:D2) of the average thickness of the first mixture layer (D1) to the average thickness of the second mixture layer (D2) may be in the range of 0.1 to 0.9:1, specifically, 0.2 to 0.8:1, 0.1 to 0.9:1, 0.3 to 0.6:1, or 0.4 to 0.55:1. More specifically, physical properties such as electrode capacity can be secured by forming the thickness of the second mixture layer (D2) to be greater than the thickness of the first mixture layer (D1) formed to contact the current collector.

Further, the current collector is not particularly limited as long as it has conductivity without causing chemical changes in the battery. Examples of the negative electrode current collector include copper, stainless steel, aluminum, nickel, titanium, sintered carbon, copper or stainless steel of which the surface has been treated with carbon, nickel, titanium, silver or the like, an aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

Further, in one example of the present invention, the negative electrode may have a thickness of 50 μm to 300 μm.

Referring to FIG. 1, the prepared negative electrode 100 may have a structure in which the first mixture layer 21 and the second mixture layer 31 are sequentially stacked on the negative electrode current collector 11 formed of a copper foil. Specifically, the first mixture layer 21 and the second mixture layer 31 contain graphite as a carbon-based active material, and the first mixture layer 21 contains silicon oxide and carbon nanotube.

Further, in the present invention, the negative electrode 200 prepared as in FIG. 2 may have a structure in which the first mixture layer 22 and the second mixture layer 32 are sequentially formed on the negative electrode current collector 12 formed of a copper foil. At this time, the thickness of the first mixture layer 22 is smaller than that of the second mixture layer 32. At this time, as the first mixture layer 22 is formed to be relatively very thin, the bonding force with the current collector may be enhanced, and the deterioration of the physical properties of the electrode can be prevented.

Further, it is possible to prepare a negative electrode 300 prepared as in FIG. 3. Referring to FIG. 3, the prepared negative electrode 300 has a structure in which the first mixture layer 23 and the second mixture layer 33 are stacked on the negative electrode current collector 13 formed of a copper foil, but the second mixture layer 33 contains silicon oxide and carbon nanotube.

The present invention provides a secondary battery including the negative electrode described above. In one example, the secondary battery is a lithium secondary battery. The shape of the secondary battery is not particularly limited, and the secondary battery may have a pouch type or cylindrical structure.

The secondary battery includes an electrode assembly including a positive electrode, a negative electrode, and a separator interposed between the positive electrode and the negative electrode; a non-aqueous electrolyte solution impregnating the electrode assembly; and a battery case containing the electrode assembly and the electrolyte solution.

In the present invention, the secondary battery has a structure of including an electrode assembly including a positive electrode, a negative electrode, and a separator interposed between the positive electrode and the negative electrode; an non-aqueous electrolyte solution impregnating the electrode assembly; and a battery case containing the electrode assembly and the non-aqueous electrolyte solution. The non-aqueous electrolyte solution is, for example, an electrolyte solution containing a lithium salt.

The positive electrode has a structure in which a positive electrode mixture layer is stacked on one or both sides of a positive electrode current collector. In one example, the positive electrode mixture layer includes a positive electrode active material, a conductive material and a binder polymer, etc. and if necessary, may further include a positive electrode additive commonly used in the art.

The positive electrode active material may be a lithium-containing oxide, and may be the same or different. A lithium-containing transition metal oxide may be used as the lithium-containing oxide.

For example, the lithium-containing transition metal oxide may be any one or a mixture of two or more selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0\leq y<1$), $Li_xNi_{1-y}Mn_yO_2$ ($0.5<x<1.3$, $O\leq y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$) and $Li_xFePO_4$ ($0.5<x<1.3$), and the lithium-containing transition metal oxide may be coated with a metal or metal oxide such as aluminum (Al). Further, in addition to the lithium-containing transition metal oxide, one or more of sulfide, selenide, and halide may be used.

The positive electrode according to the present invention can be applied to various types of lithium secondary batteries, but, for example, may be used for high-power batteries.

The positive electrode active material layer of the present invention is applied to a high content nickel (High-Ni)-based NCM battery.

In a specific example, the positive electrode active material layer according to the present invention includes an active material component having a structure represented by Chemical Formula 1 or Chemical Formula 2 below.

$$Li_x(Ni_aCo_bMn_c)O_2 \quad \text{[Chemical formula 1]}$$

(0.5<x<1.3, 0.5<a<1, 0<b<0.25, 0<c<0.25, a+b+c=1)

In Chemical Formula 1, the value a is 0.6 or more, specifically 0.8 or more. In the Formula 1, as the value a increases, the value b and/or value c decrease within the range satisfying the above Formula 1. Through this, the positive electrode for a lithium secondary battery according to the present invention is applied to a high-Ni-based NCM secondary battery.

$$Li_x(Ni_aCo_bMn_cAl_d)O_2 \quad \text{[Chemical formula 2]}$$

where 0.5<x<1.3, 0.6<a<1, 0<b<0.2, 0<c<0.1, 0<d<0.1, a+b+c+d=1.

In the Chemical Formula 2, "a" is equal to or greater than 0.6, specifically, equal to or greater than 0.8, and more specifically, equal to or greater than 0.83.

The NCM secondary battery may be, for example, NCM 622, NCM 651520, NCM 712 or NCM 811 (Ni ≥80%). In the case of NCMA, the output is high while maintaining stability as in NCM by adding aluminum while reducing the cobalt ratio.

The current collector used for the positive electrode is a metal having high conductivity, and any metal which the positive electrode active material slurry may be easily attached to and which is not reactive in the voltage range of the electrochemical device can be used. Specifically, non-limiting examples of the current collector for the positive electrode include aluminum, nickel, or a foil manufactured by a combination thereof.

The positive electrode active material may be included in the range of 90.0 to 98.5 wt % in the positive electrode mixture layer. When the content of the positive electrode active material satisfies the above range, it is advantageous in terms of manufacturing a high-capacity battery and providing sufficient conductivity of the positive electrode or adhesion between electrode materials.

The current collector used for the positive electrode is a metal having high conductivity, and any metal which the positive electrode active material slurry may be easily attached to and which is not reactive in the voltage range of the secondary battery can be used. Specifically, non-limiting examples of the current collector for the positive electrode include aluminum, nickel, or a foil manufactured by a combination thereof.

The positive electrode mixture layer further includes a conductive material. The conductive material is usually added in an amount of 1 to 30% by weight based on the total weight of the mixture including the positive electrode active material. Such a conductive material is not particularly limited as long as it has conductivity without causing a chemical change in the secondary battery. For example, graphite such as natural graphite or artificial graphite; carbon black such as carbon black, acetylene black, ketjen black, channel black, furnace black, lamp black, or thermal black; conductive fiber such as carbon fiber or metal fiber; metal powder such as carbon fluoride, aluminum, or nickel powder; conductive whisker such as zinc oxide or potassium titanate; conductive metal oxide such as titanium oxide; polyphenylene derivative, and carbon nano tube (CNT) may be used as the conductive material.

As the binder component, a binder polymer commonly used in the art may be used without limitation. For example, various kinds of binders such as polyvinylidene fluoride-co-hexafluoropropylene (PVDF-co-HFP), polyvinylidene fluoride (PVDF), polyacrylonitrile, polymethyl methacrylate, styrene-butadiene rubber (SBR), and carboxyl methyl cellulose (CMC) may be used.

The binder polymer content is proportional to the conductive material content included in the positive electrode mixture layer. This is to impart adhesion to conductive materials whose particle size is relatively small compared to the active material and is because when the content of the conductive material increases, more binder polymer is required, and when the content of the conductive material decreases, less binder polymer can be used.

The negative electrode may include a negative electrode current collector, and a mixture layer of a double layer structure formed on the negative electrode current collector.

Non-limiting examples of the current collector used for the negative electrode include copper, gold, nickel, or a foil manufactured by a copper alloy or a combination thereof. In addition, the current collector may be used by stacking substrates made of the above materials.

The separator may be made of any porous substrate used in a lithium secondary battery, and for example, a polyolefin-based porous membrane or a nonwoven fabric may be used, but the present invention is not particularly limited thereto.

Examples of the polyolefin-based porous membrane include polyethylene such as high density polyethylene, linear low density polyethylene, low density polyethylene, ultra high molecular weight polyethylene, and a membrane in which polyolefin-based polymers, such as polypropylene, polybutylene, or polypentene, are each formed alone or in a mixture thereof.

Polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, and polyethylenenaphthalene, etc. may be used individually or as a polymer by a mixture thereof, to thereby form the non-woven fabric, in addition to polyolefin-based nonwoven fabric.

The structure of the nonwoven fabric may be a spunbond nonwoven fabric composed of long fibers or a melt blown nonwoven fabric.

The thickness of the porous substrate is not particularly limited, but may be 5 to 50 μm, and the pore size and porosity present in the porous substrate are also not particularly limited, but may be 0.01 to 50 μm and 10 to 95%, respectively.

Meanwhile, in order to improve mechanical strength of the separator composed of the porous substrate and to suppress a short circuit between the positive electrode and the negative electrode, a porous coating layer including inorganic particles and a binder polymer may be further included on at least one surface of the porous substrate.

The electrolyte solution may contain an organic solvent and an electrolyte salt, and the electrolyte salt is a lithium salt. Those conventionally used in the electrolyte solution for lithium secondary batteries may be used as the lithium salt without limitation. For example, one or more selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3$ $SO_2)_2CH^-$, $(SF_5)_3C^-$, $CF_3(CF_2)_7SO_3^-$, $CF_3CO_2^-$, $CH_3CO_2^-$, $SCN^-$ and $(CF_3CF_2SO_2)_2N^-$ may be included as the anion of the lithium salt.

As the organic solvent included in the electrolyte solution described above, those conventionally used in electrolyte solutions for lithium secondary batteries may be used without limitation, and for example, ethers, esters, amides, linear carbonates, and cyclic carbonates may be used alone or in combination of two or more. Among them, representatively, a cyclic carbonate, a linear carbonate, or a carbonate compound that is a mixture thereof may be included.

Specific examples of the cyclic carbonate compound include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and a halide thereof, and a mixture thereof.

These halides include, for example, fluoroethylene carbonate (FEC), but are not limited thereto.

In addition, specific examples of the linear carbonate compound include any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more of them may be typically used, but is not limited thereto.

In particular, among the carbonate-based organic solvents, ethylene carbonate and propylene carbonate, which are cyclic carbonates, are organic solvents of high viscosity and have high dielectric constants, so that lithium salts in the electrolyte can be more easily dissociated, and if the cyclic carbonate is mixed with a low viscosity, low dielectric constant linear carbonate such as dimethyl carbonate and diethyl carbonate in an appropriate ratio, an electrolyte solution having a higher electrical conductivity can be prepared.

In addition, as the ether of the organic solvent, any one selected from the group consisting of dimethyl ether, diethyl ether, dipropyl ether, methylethyl ether, methylpropyl ether, and ethylpropyl ether, or a mixture of two or more thereof may be used, but is not limited thereto.

And esters among the organic solvents include any one selected from the group consisting of methyl acetate, ethyl acetate, propyl acetate, methyl propionate, ethyl propionate, propyl propionate, γ-butyrolactone, γ-valerolactone, and γ-caprolactone, or a mixture of two or more of them, but the present invention is not limited thereto.

The injection of the non-aqueous electrolyte may be performed at an appropriate step in the manufacturing process of the secondary battery, depending on the manufacturing process and required physical properties of the final product.

DETAILED DESCRIPTION OF THE PREFERRED EMBODIMENTS

Hereinafter, the present invention will be described in more detail through examples. However, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

EXAMPLES AND COMPARATIVE EXAMPLES

Example 1

Preparation of First Negative Electrode Slurry 89.6 parts by weight of graphite as the carbon-based active material, 4.7 parts by weight of SiO as the silicon-based active material, 1 parts by weight of carbon black and 0.5 parts by weight of MWCNT as the conductive material, and 4.2 parts by weight of styrene-butadiene rubber (SBR), carboxymethylcellulose (CMC) and polyvinylpyrrolidone (PVP) are mixed with distilled water, to thereby prepare a first negative electrode slurry.

Preparation of Second Negative Electrode Slurry 96.3 parts by weight of graphite as the carbon-based active material, 1 parts by weight of carbon black as the conductive material, and 2.7 parts by weight of styrene-butadiene rubber (SBR) and carboxymethylcellulose (CMC) as the binder were mixed with distilled water, to thereby prepare a second negative electrode slurry.

Preparation of Negative Electrode

A first negative electrode slurry is coated on one surface of a copper (Cu) thin film which is a negative electrode current collector of a thickness of 6 μm, and a second negative electrode slurry is then coated on the first negative electrode slurry by using a double slot die. Thereafter, a first mixture layer and a second mixture layer were formed on the negative electrode current collector by drying at conditions of the temperature of 50 to 75° C. and the airflow volume of 500 to 3000 RPM by using pilot drying equipment.

A negative electrode including a mixture layer having a double layer structure was prepared by simultaneously rolling the first mixture layer and the second mixture layer by a roll pressing scheme. At this time, the thickness ratio of the first mixture layer to the second mixture layer is 1:1.

Preparation of Positive Electrode 97.55 parts by weight of $Li(Ni_{0.8}Mn_{0.1}Co_{0.1})O_2$ (NCM-811) as a positive electrode active material, 1 parts by weight of carbon black as a conductive material, and 1.45 parts by weight of polyvinylidene fluoride (PVdF) as a binder and the conductive material were mixed with N-methyl pyrrolidone as a solvent, to thereby prepare a positive electrode active material slurry. Further, the slurry was coated on one surface of an aluminum current collector having a thickness of 15 μm, which was then dried and rolled in the same condition as in the negative electrode, to thereby prepare a positive electrode.

Preparation of Lithium Secondary Battery

A non-aqueous electrolyte solution was prepared by dissolving $LiPF_6$ and LiFSi in an organic solvent, in which ethylene carbonate (EC), propylene carbonate (PC), and ethyl methyl carbonate (EMC) were mixed in a composition of 25:5:70 (volume ratio). Herein, $LiPF_6$ and LiFSi were dissolved in the organic solvent to be a concentration of 1.2M. On the other hand, some additives may be further included to ensure battery performance.

Further, a polyolefin separator was interposed between the prepared positive electrode and the negative electrode, which was then laminated, to thereby implement a first bi-cell form. The 26 bi-cells were laminated to produce a packaging cell through the welding and package process. At this time, in order to minimize moisture inside the cell, the packaging cell was stored at 55° C. dry chamber for at least 3 days, and the electrolyte solution was then injected, to thereby prepare a lithium secondary battery.

Example 2

Preparation of Negative Electrode

The negative electrode was prepared in the same manner as in Example 1, except that 90.11 parts by weight of graphite as the carbon-based active material, 4.74 parts by weight of SiO as the silicon-based active material, 1.0 parts by weight of carbon black and 0.02 parts by weight of SWCNT as the conductive material, and 4.13 parts by weight of SBR and CMC as the binder were mixed with distilled water to thereby prepare a second negative electrode slurry.

Preparation of Lithium Secondary Battery

The lithium secondary battery was prepared in the same manner as in Example 1, except that the prepared negative electrode was used.

Example 3

Preparation of First Negative Electrode Slurry 94.9 parts by weight of graphite as the carbon-based active material, 1 parts by weight of carbon black as the conductive material, and 4.1 parts by weight of SBR and CMC as the binder were mixed with distilled water to thereby prepare a first negative electrode slurry.

Preparation of Second Negative Electrode Slurry 90.91 parts by weight of graphite as the carbon-based active material, 4.79 parts by weight of SiO as the silicon-based active material, 1 parts by weight of carbon black and 0.5 parts by weight of MWCNT as the conductive material, and 2.7 parts by weight of SBR, CMC and PVP as the binder were mixed with distilled water to thereby prepare a second negative electrode slurry.

Preparation of Lithium Secondary Battery

The lithium secondary battery was prepared in the same manner as in Example 1, except that the prepared negative electrode was used.

Example 4

Preparation of Negative Electrode

The negative electrode was prepared in the same manner as in Example 3, except that 91.44 parts by weight of graphite as the carbon-based active material, 4.81 parts by weight of SiO as the silicon-based active material, 1.0 parts by weight of carbon black and 0.02 parts by weight of SWCNT as the conductive material, and 2.73 parts by weight of SBR and CMC as the binder were mixed with distilled water to thereby prepare a second negative electrode slurry.

Preparation of Lithium Secondary Battery

The lithium secondary battery was prepared in the same manner as in Example 3, except that the prepared negative electrode was used.

Example 5

Preparation of Negative Electrode

A negative electrode was prepared in the same manner as in Example 1 except that the thickness ratio of the first mixture layer to the second mixture layer is 3:7.

Preparation of Lithium Secondary Battery

The lithium secondary battery was prepared in the same manner as in Example 1, except that the prepared negative electrode was used.

Comparative Example 1

Preparation of Negative Electrode 92.6 parts by weight of graphite as the carbon-based active material, 2.4 parts by weight of SiO as the silicon-based active material, 1 parts by weight of carbon black and 0.5 parts by weight of MWCNT as the conductive material, and 3.5 parts by weight of SBR, CMC and PVP as the binder were mixed with distilled water to thereby prepare a negative electrode slurry.

A negative electrode was prepared in the same manner as in Example 1 except that there is one slot die.

Preparation of Lithium Secondary Battery

The lithium secondary battery was prepared in the same manner as in Example 1, except that the prepared negative electrode was used.

Comparative Example 2

Preparation of Negative Electrode

The negative electrode was prepared in the same manner as in Comparative example 1, except that 93.2 parts by weight of graphite as the carbon-based active material, 2.4 parts by weight of SiO as the silicon-based active material, 1 parts by weight of carbon black as the conductive material, and 3.4 parts by weight of SBR and CMC as the binder were mixed with distilled water to thereby prepare a negative electrode slurry.

Preparation of Lithium Secondary Battery

The lithium secondary battery was prepared in the same manner as in Example 1, except that the prepared negative electrode was used.

The composition of the negative electrode prepared in Examples and Comparative Examples is shown in Table 1 below.

TABLE 1

| | | | | Electrode composition (parts by weight) | | | | |
|---|---|---|---|---|---|---|---|---|
| Example No. | Electrode coating type | Coating layer | Conductive material | graphite | SiO | Graphite:SiO | Conductive material (carbon black:CNT) | Binder |
| Example 1 | DLD | upper part | carbon black | 96.3 | 0 | (100:0) | 1.0 | 2.7 |
| | | lower part | carbon black + MWCNT | 89.6 | 4.7 | (95:5) | 1.5 (1:0.5) | 4.2 |
| Example 2 | DLD | upper part | carbon black | 96.3 | 0 | (100:0) | 1.0 | 2.7 |
| | | lower part | carbon black + SWCNT | 90.11 | 4.74 | (95:5) | 1.02 (1:0.02) | 4.13 |

TABLE 1-continued

| Example No. | Electrode coating type | Coating layer | Conductive material | graphite | SiO | Graphite:SiO | Conductive material (carbon black:CNT) | Binder |
|---|---|---|---|---|---|---|---|---|
| Example 3 | DLD | upper part | carbon black + MWCNT | 90.91 | 4.79 | (95:5) | 1.5 (1:0.5) | 2.8 |
|  |  | lower part | carbon black | 94.9 | 0 | (100:0) | 1.0 | 4.1 |
| Example 4 | DLD | upper part | carbon black + SWCNT | 91.44 | 4.81 | (95:5) | 1.02 (1:0.02) | 2.73 |
|  |  | lower part | carbon black | 94.9 | 0 | (100:0) | 1.0 | 4.1 |
| Comparative Example 1 | SLD |  | carbon black + SWCNT | 92.6 | 2.4 | (97.5:2.5) | 1.5 (1:0.5) | 3.5 |
| Comparative Example 2 | SLD |  | carbon black | 93.2 | 2.4 | (97.5:2.5) | 1.0 | 3.4 |

Experimental Example

Experimental Example 1 Observation of Cross-Section of Negative Electrode

The cross-sections of the negative electrodes prepared in Examples 2 and 4 and Comparative example 1 were observed by using a scanning electron microscope (SEM), and the results were shown in FIGS. 4, 5 and 6.

Referring to FIGS. 4 and 5, it was confirmed that silicon oxide was distributed in a first mixture layer and a second mixture layer, respectively. On the other hand, in FIG. 6, silicon oxide is distributed throughout the negative electrode. As such, in the embodiment of the present invention, it was possible to provide a negative electrode in which silicon oxide is distributed in the first mixture layer or the second mixture layer.

Experimental Example 2 Evaluation of Capacity Retention Rate

The battery characteristics of the secondary battery prepared in the Examples 1 to 4 and Comparative examples 1 to 2 were evaluated in the following methods.

Specifically, for each of the secondary batteries manufactured in the above Examples 1 to 4 and Comparative examples 1 to 2, the capacity retention ratio of the discharge capacity at the 300-th cycle based on the initial capacity was measured after performing charge/discharge 300 times at the conditions of 0.33 C/0.33 C within the driving voltage range of 2.5 to 4.2V at a room temperature of 25° C. and at a high temperature of 45° C. The results are shown in Table 2 below.

TABLE 2

| Example No. | Capacity change after 300 cycles at 25° C. capacity retention rate (%) | Capacity change after 300 cycles at 45° C. capacity retention rate (%) |
|---|---|---|
| Example 1 | 95.7 | 89.4 |
| Example 2 | 96.8 | 90.7 |
| Example 3 | 93.9 | 88.5 |
| Example 4 | 94.8 | 89.9 |
| Comparative Example 1 | 92.9 | 88.1 |
| Comparative Example 2 | 91.3 | 86.9 |

Referring to Table 2, the capacity retention rates of the secondary battery in Examples 1 to 4 were greater than the capacity retention rates in the comparative examples, and the capacity retention rates of the secondary battery in Examples 1 to 4 at a high temperature were greater than the capacity retention rates in the comparative examples. Particularly, the capacity retention rate of Example 2, in which the silicon oxide and the carbon black/SWCNT as the conductive material are included in the first mixture layer, was the best.

Experimental Example 3 Measurement of Adhesive Force

Each of the electrode plates of the negative electrodes, which were manufactured in Examples 1, 2 and 5 and Comparative example 2, was cut into a width of 20 mm and was then fixed at a slide glass, and the current collector was peeled off at a rate of 100 mm/min to measure 90 degree peeling strength, and the result was shown in Table 3 below.

TABLE 3

| Example No. | Adhesive force (gf/20 mm) |
|---|---|
| Example 1 | 36 |
| Example 2 | 43 |
| Example 5 | 45 |
| Comparative Example 2 | 20 |

Referring to Table 3, the adhesive force between the negative electrode current collector and the mixture layer in Examples 1 and 2 was significantly greater that of Comparative example 2. Particularly, the adhesive force between the negative electrode current collector and the mixture layer in Example 5, in which the thickness ratio of the first mixture layer to the second mixture layer was 3:7, was the best.

In Comparative example 1, a single-layer coating, not a double layer coating, was applied. In this case, it was not possible to implement sufficient adhesive force between the mixture layer and the negative electrode current collector.

The above description is merely illustrative of the technical idea of the present invention, and those skilled in the art to which the present invention pertains may make various modifications and variations without departing from the essential characteristics of the present invention. Therefore, the embodiments disclosed in the present invention are not intended to limit the technical idea of the present invention but to describe the present invention, and the scope of the technical idea of the present invention is not limited by these embodiments. The scope of protection of the present invention should be interpreted by the following claims, and all technical ideas within the scope equivalent thereto should be construed as being included in the scope of the present invention.

DESCRIPTION OF REFERENCE NUMERALS 11, 12, 13: negative electrode current collector
21, 22, 23: first mixture layer
31, 32, 33: second mixture layer
100, 200, 300: negative electrode for secondary battery

What is claimed is:

1. A negative electrode for a secondary battery, comprising:
    a current collector; and a mixture layer formed on one or both surfaces of the current collector,
    wherein the mixture layer has a two-layer structure in which a first mixture layer and a second mixture layer are stacked,
    wherein the first mixture layer includes a first carbon material and a silicon oxide as a first active materials in a weight ratio of 90:10 to 99:1 and a first needle type carbon-based conductive material as a first conductive material,
    wherein the second mixture layer includes a second carbon material as a second active material and a second sphere type carbon-based conductive material as a second conductive material,
    wherein the first mixture layer is disposed directly on the current collector,
    wherein the second mixture layer is disposed on a surface of the first mixture layer on which the current collector is not disposed,
    wherein the silicon oxide is included only in the first mixture layer, and
    wherein the first needle type carbon-based conductive material is included in only one of the first mixture layer or the second mixture layer.

2. The negative electrode of claim 1, wherein the first conductive material includes the first needle type carbon-based conductive material and a first sphere type carbon-based conductive material in a weight ratio of 0.01:5 to 1:0.5.

3. The negative electrode of claim 1, wherein the first mixture layer and the second mixture layer include first and second binders, respectively, and wherein a weight ratio (B1:B2) of the first binder content (B1) to the second binder content (B2) is in a range of 1.0:1 to 3.6:1.

4. The negative electrode of claim 3, wherein an amount of the first binder is 1 to 10 weight percent of the first mixture layer.

5. The negative electrode of claim 1, wherein the first mixture layer includes:
    90 to 100 parts by weight of the first carbon material and 1 to 10 parts by weight of silicon oxide as the first active materials; 0.5 to 5 parts by weight of the first conductive material; and
    1 to 10 parts by weight of a first binder.

6. The negative electrode of claim 1, wherein the second mixture layer includes:
    90 to 100 parts by weight of the second carbon material as the second active material; 0.5 to 5 parts by weight of the second sphere type carbon-based conductive material as the second conductive material; and
    1 to 10 parts by weight of a second binder.

7. The negative electrode of claim 1, wherein the second sphere type carbon-based conductive material is carbon black, and
    wherein the first needle type carbon-based conductive material is a carbon nanotube (CNT), a vapor-grown carbon fiber (VGCF), a carbon nanofiber (CNF), or a mixture of two or more thereof.

8. The negative electrode of claim 1,
    wherein a ratio (D1:D2) of an average thickness (D1) of the first mixture layer to an average thickness of the second mixture layer (D2) is in a range of a thickness ratio of 0.1:1 to 0.9:1.

9. A secondary battery comprising:
    the negative electrode for the secondary battery according to claim 1;
    a positive electrode containing a lithium-containing oxide as an active material; and
    a separator interposed between the negative electrode and the positive electrode.

10. The secondary battery of claim 9, wherein the lithium-containing oxide has a structure represented by one of following chemical formulas:

where $0.5<x<1.3$, $0.5<a<1$, $0<b<0.25$, $0<c<0.25$, $a+b+c=1$, and

where $0.5<x<1.3$, $0.6<a<1$, $0<b<0.2$, $0<c<0.1$, $0<d<0.1$, $a+b+c+d=1$.

11. The negative electrode of claim 1, wherein the first needle type carbon-based conductive material has an aspect ratio in a range of 50 to 650.

12. The negative electrode of claim 1, wherein the first needle type carbon-based conductive material has an aspect ratio in a range of 100 to 300.

13. The negative electrode of claim 1, wherein the first needle type carbon-based conductive material comprises a carbon nanotube (CNT).

14. The negative electrode of claim 1, wherein the first needle type carbon-based conductive material comprises a vapor-grown carbon fiber (VGCF).

15. The negative electrode of claim 1, wherein the first needle type carbon-based conductive material comprises a carbon nanofiber (CNF).

* * * * *